(12) United States Patent
Tenney et al.

(10) Patent No.: US 6,249,634 B1
(45) Date of Patent: Jun. 19, 2001

(54) FIBER OPTIC CABLE COILING TRAY

(75) Inventors: Douglas A. Tenney, Audubon; Charles F. Niesley, Lansdale; Thomas J. Hagen, Perkiomenville; Steven Frederick, Jamison, all of PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/489,624

(22) Filed: Jan. 24, 2000

Related U.S. Application Data
(60) Provisional application No. 60/117,193, filed on Jan. 26, 1999.

(51) Int. Cl.[7] .................................................... G02B 6/00
(52) U.S. Cl. .......................... 385/135; 385/134; 385/136; 385/137
(58) Field of Search .................................... 385/135, 134, 385/136, 137, 139, 138

(56) References Cited

U.S. PATENT DOCUMENTS

| 6,091,876 | * | 7/2000 | Hizuka et al. | 385/135 |
| 6,144,792 | * | 7/2000 | Kim et al. | 385/135 |

* cited by examiner

Primary Examiner—Phan T. H. Palmer
(74) Attorney, Agent, or Firm—Volpe and Koenig, P.C.

(57) ABSTRACT

A fiber optic cable tray comprising a platform substantially encircled by a peripheral wall extending from the platform. An internal wall extends across the platform and defines first and second chambers and a passage therebetween. The fiber optic cable passes from the first chamber, through the passage, and through the second chamber. A retainer positioned in the passage receives and arrestingly engages the fiber optic cable as it passes from the first chamber to the second chamber, thereby fixing the length of the portion of cable passing through the second chamber.

15 Claims, 5 Drawing Sheets

FIBER OPTIC CABLE COILING TRAY

This application claims the benefit of U.S. Provisional Application No. 60/117,193 filed Jan. 26, 1999.

BACKGROUND OF THE INVENTION

This invention relates generally to fiber optic cable handling. More particularly, the invention relates to a fiber optic communication component having a housing frame enclosing either a fiber optic transmitter or receiver which allows for temporary detachment of an associated fiber optic connector. Most particularly, the invention relates to a coiling tray positioned in the housing frame which reduces the likelihood of damage to the fiber optic cable during maintenance of the connector.

Optical communication is attractive for use in numerous applications due to the information carrying potential. The amount of information that can be sent over an electromagnetic wave is proportional to the bandwidth of the wave. For example, 1000 times as much information can be conveyed each second in a 4-MHz bandwidth black-and-white television signal as in a 4-kHz telephone signal. Communication systems employing fiber optics and lasers operate with exceedingly large bandwidths. For example, the bandwidth of a mode-locked neodymium: glass laser that produces 30 picosecond pulses is approximately 30 GHz. With such a large bandwidth, it is possible to transmit five thousand color TV broadcasts over a single laser beam.

While bandwidth is a great advantage of optical communication, the optical radiation is affected by anything that resides in the direct path. Disadvantages such as connecting and splicing fiber optic cables and the fragility of the fiber such as minimum bend radii are still problematic.

Most fiber optic communication devices compare with conventional electromagnetic devices regarding operational life and failure rates. The problem they share is related to the mechanical connections of their communication medium. Just as hard wired devices desire a sound mechanical connection to maintain electrical continuity, similar demands are required by optical fibers to prevent attenuation of the signal. Maintenance for an optical connector is different than its electrical counterpart. Due to the increased fragility of the fiber itself, special considerations are taken into account to obviate potential damage to the fibers. In particular, care must be taken not to bend, crimp, pinch, or tangle the fiber optic cable during manufacture, installation, troubleshooting, repair or maintenance of the fiber optic system.

To facilitate periodic inspection, maintenance and cleaning of fiber optic connectors, enclosures that allow a connector to be removed and reinserted without disassembly or the requirement of tools have been developed. Referring to FIGS. 1 and 2, an illustrative enclosure 15 is shown. The enclosure 15 includes a housing frame 17 and cover 19, and internal subcomponents including a signal processing board 21 and a transmitter/receiver module 25. The housing frame 17 includes a slot 39 configured to receive a desired connection adapter 31. The slot 39 can be configured to receive numerous adapters 31 which facilitate the interconnection of various fiber optic connectors, including SC, FC and LC connectors. A spring clip 41 affixed to the cover 19 captures the adapter 31 after placement in the slot 39. A finger tab 43 integrated with the spring clip 41 provides a finger leverage means to retract the spring clip 41 when detaching the connector 29/adapter 31 assembly from the housing frame 17. Rapid detachment and withdrawal of the connector 29/adapter 31 assembly is performed by pulling the spring clip 41 with the finger tab 43 and detaching the connector from the housing frame 17 and cover 19. Replacement of the connector 29/adapter 31 is performed with the reverse steps.

While these enclosures 15 have provided easier access to the fiber optic connectors 29, damage may occur to the fiber optic cable 27 as the connector 29/adapter 31 assembly is pulled from or reinserted into the enclosure 15. For example, a technician may not have an indication of the amount of cable slack and therefore may overextend the cable beyond its minimum bend radius or the cable may crimp,"bird nest" or become entangled upon reinsertion.

Accordingly, there is a need for a device which guides the cable and reduces the likelihood of damage thereto.

SUMMARY OF THE INVENTION

The present invention relates to a fiber optic cable tray. The tray comprises a platform substantially encircled by a peripheral wall extending from the platform. An internal wall extends across the platform to define first and second chambers and a passage therebetween. The fiber optic cable is routed such that it passes from the first chamber, through the passage, and through the second chamber. A retainer is positioned in the passage and receives and arrestingly engages the fiber optic cable as it passes from the first chamber to the second chamber. As such, the portion of cable passing through the second chamber has a fixed length. The tray walls are preferably arcuate to prevent bending of the cable past its minimum bend radius.

The tray is preferably utilized with an optical communication component including a housing frame which houses an optical processing module and a removal optical connector. The connector can be removed for cleaning, inspection and the like. The connector is coupled with the fixed length of cable which minimizes the chance of overextending the cable during removal and also facilitates easier reinsertion of the cable and connector into the housing frame.

DESCRIPTION OF THE PREFERRED EMBODIMENT

Figure 1:
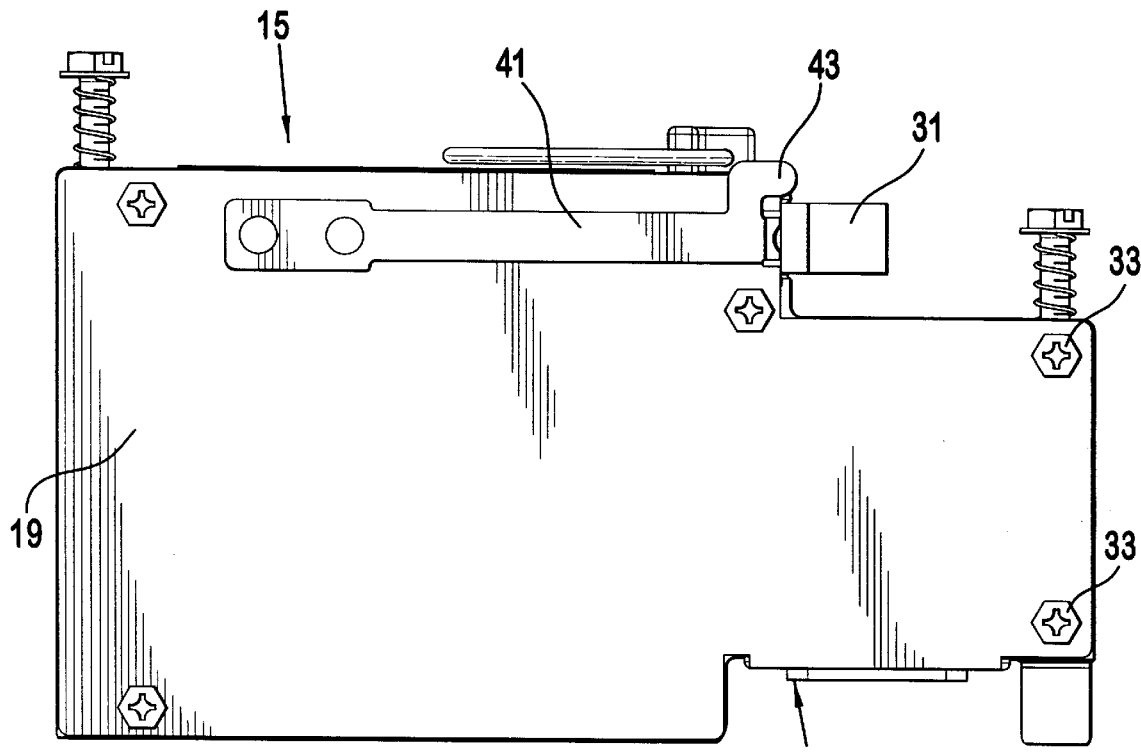
FIG. 1 is a top plan view of a prior art enclosure.
Figure 2:
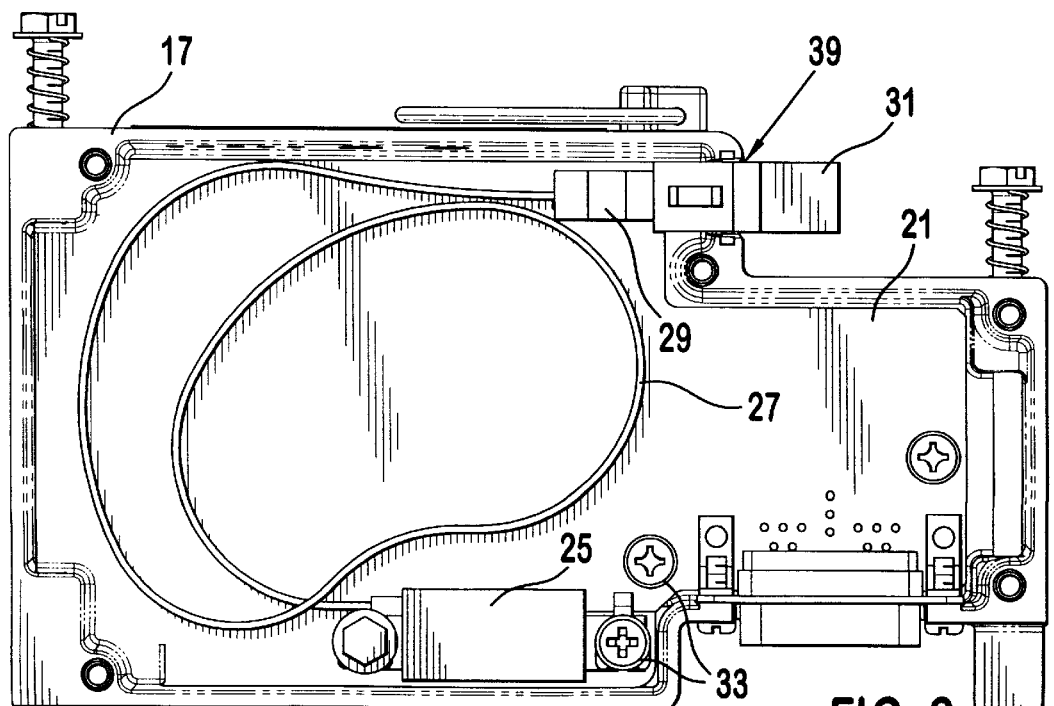
FIG. 2 is a top plan view of the enclosure of FIG. 1 with its cover removed.

The preferred embodiment will be described with reference to the drawing figures where like numerals represent like elements throughout.

The preferred embodiment of the coiling tray 50 of the present invention is shown in FIGS. 3–8. Referring to FIGS. 3–6, the preferred coiling tray 50 includes a raised platform 52 supported by a plurality of legs 54 depending from its lower surface 52b. The platform upper surface 52a is encircled along a majority of its external edge by a peripheral wall 60. An internal wall 62 extends across the platform 52 to define two encircled chambers 64 and 66 with a passage 68 therebetween.

Figure 3:
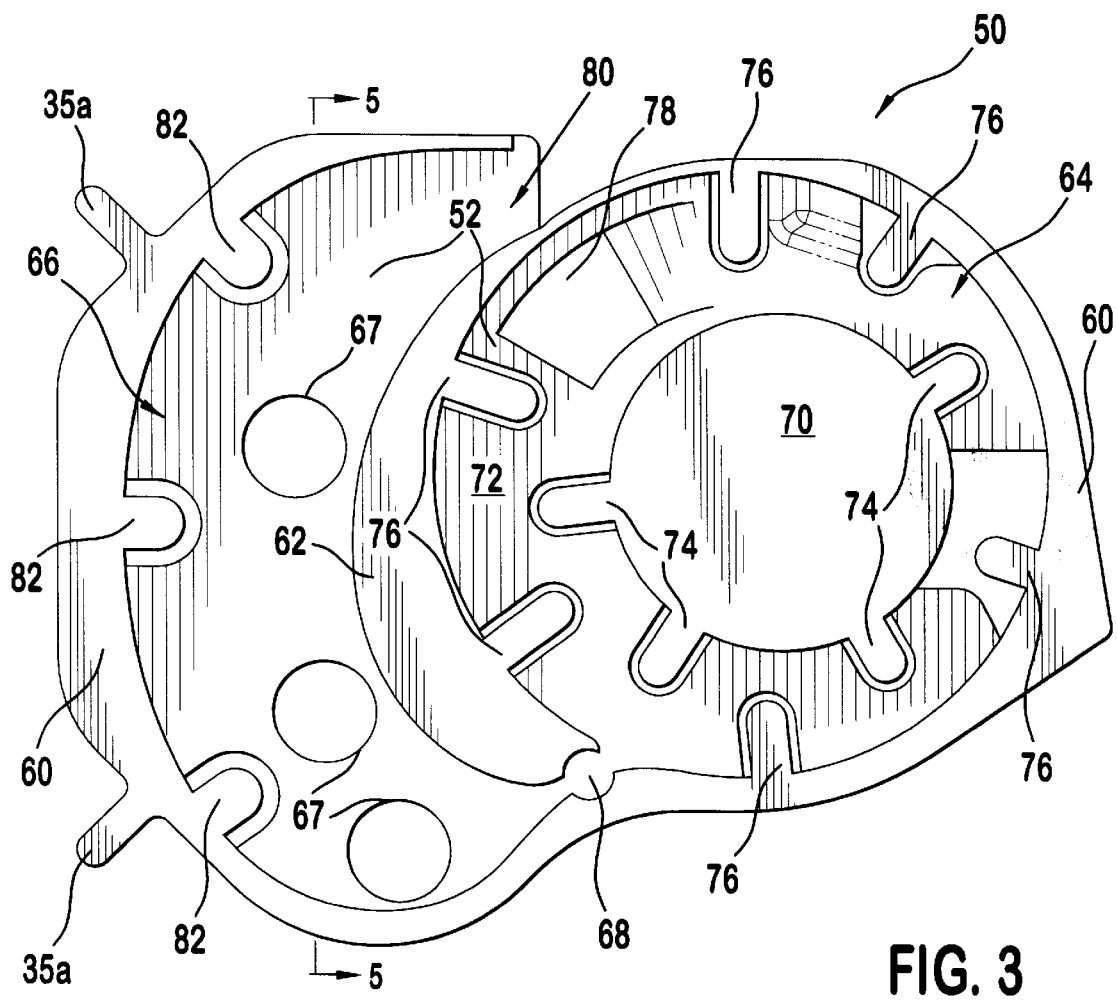
FIG. 3 is a top plan view of the preferred coiling tray of the present invention.
Figure 4:
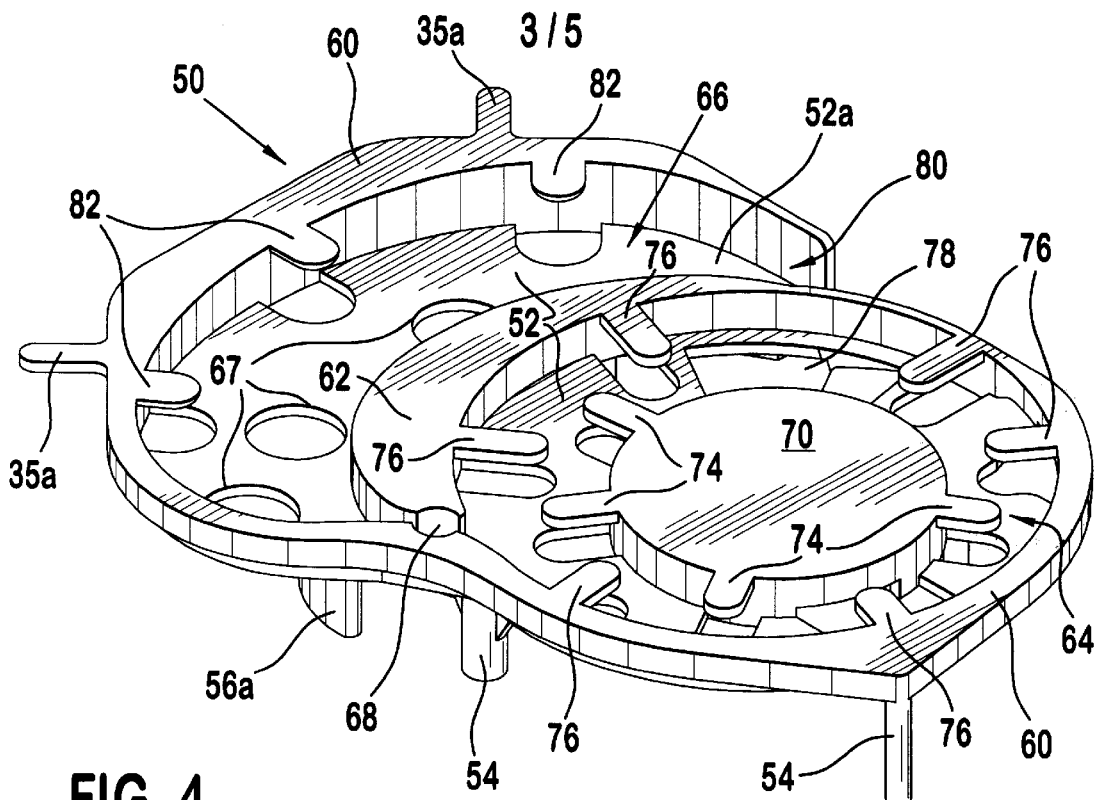
FIG. 4 is a top isometric view of the coiling tray of FIG. 3.

Referring to FIGS. 3 and 4, chamber 64 is configured to loosely maintain a portion of the fiber optic cable 27 in a generally circular configuration. The peripheral wall 60 and the internal wall 62 define a generally circular enclosure about the chamber 64. A circular mandrel 70 extends from the platform 52 slightly offset from co-axial alignment with the generally circular enclosure. A storage area 72 is defined between the mandrel 70 and the circular enclosure about the chamber 64. The fiber optic cable 27 is loosely coiled about the mandrel 70 in the storage area 72. The mandrel 70 is configured to preserve a desired minimum bend radius in the cable 27. A plurality of tabs 74 and 76 extend from the mandrel 70 and walls 60,62, respectively, over the storage area 72 to further confine the fiber optic cable 27. A ramped aperture 78 extends through the storage area 72 of the platform 52 and serves as an inlet to the chamber 64. The fiber optic cable 27 exits through the passage 68 into the second chamber 66.

Figure 5:
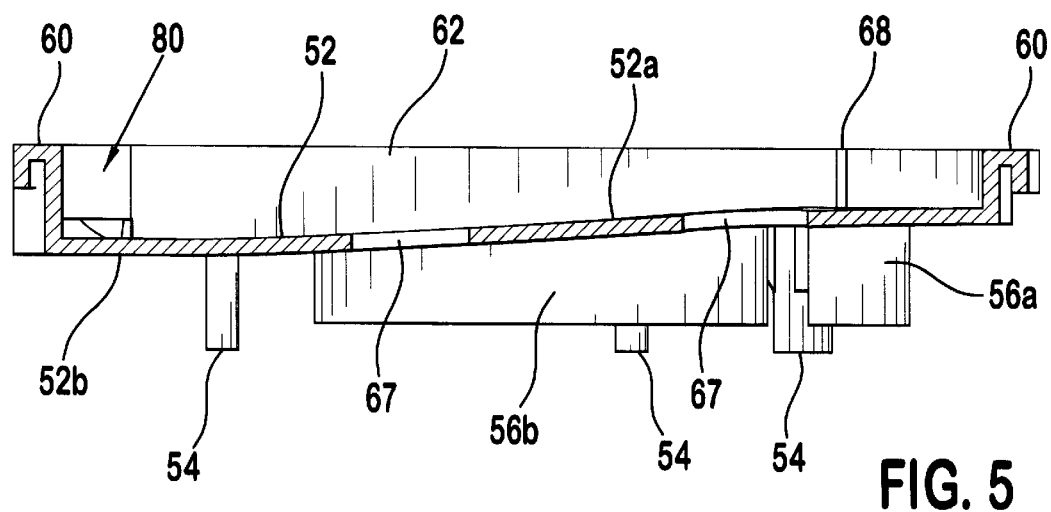
FIG. 5 is a sectional view taken along the line 5—5 in FIG. 3.

Referring to FIGS. 3–5, chamber 66 is defined between the peripheral wall 60 and the internal wall 62. The walls 60 and 62 define the passage 68 between the two chambers 64 and 66 and an outlet 80. Referring to FIG. 5, the platform 52 in chamber 66 is preferably sloped from the area of the passage 68 to the area of the outlet 80. This allows a portion of fiber optic cable to be maintained in the raised chamber 64 while permitting the connector end of the cable 27 exiting through the outlet 80 to have a more central height to align with the slot 39 in the housing frame 17. The sloped surface is also more conducive to receiving the cable 27 as the connector 29/adapter 31 assembly is reinserted into the enclosure 15.

The surface of internal wall 62 defining chamber 66 is arcuate. The arc is configured to prevent the fiber optic cable from being bent beyond its minimum bend radius. The peripheral wall 60 also has an arcuate shape about chamber 66. Its arc is configured to confine the cable 27, but allow some slacking of the cable 27. Tabs 82 extend from the peripheral wall 60 to further confine the cable 27.

Figure 6:
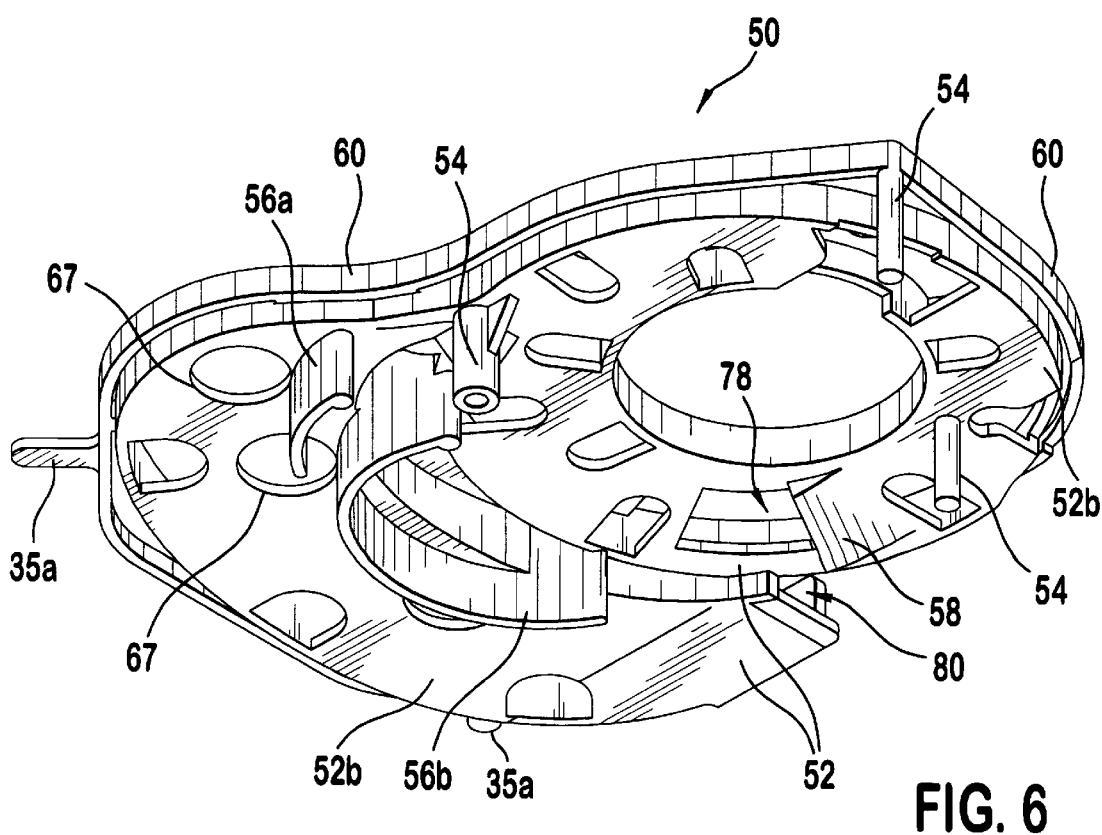
FIG. 6 is a bottom isometric view of the coiling tray of FIG. 3.

Referring to FIG. 6, ramp 58 extends to aperture 78, defining a path toward chamber 64. The ramp 58 guides the fiber optic cable into chamber 64 and helps prevent inadvertent crimping or the like. Guide walls 56a and 56b also depend from the lower surface 52b of the platform 52. The guide walls 56a and 56b guide the fiber optic cable 27 from the module 25 to the ramped aperture 78 while preserving the minimum bend radius.

Figure 7:
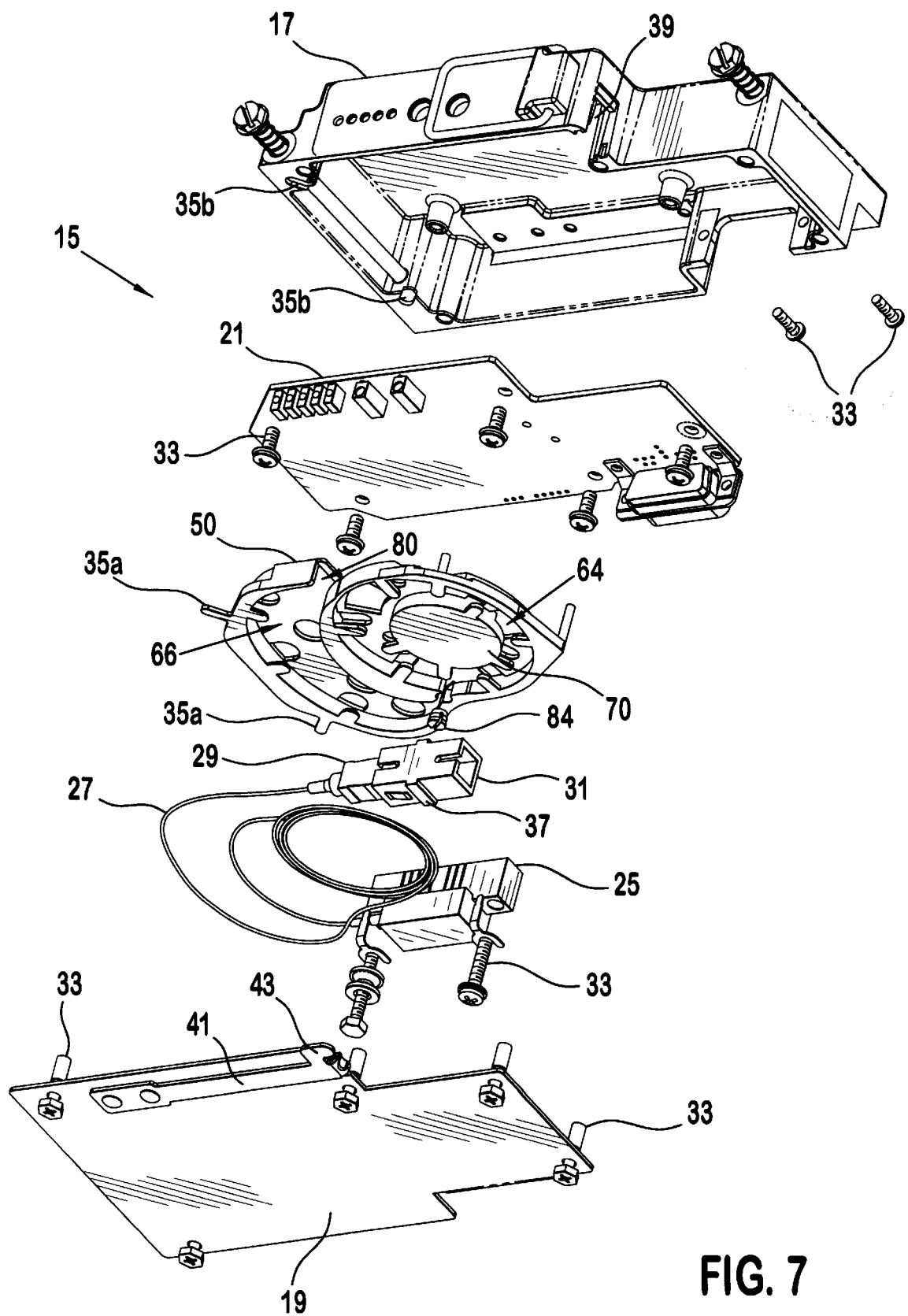
FIG. 7 is an exploded isometric view with the coiling tray of FIG. 3 positioned relative to an enclosure.
Figure 8:
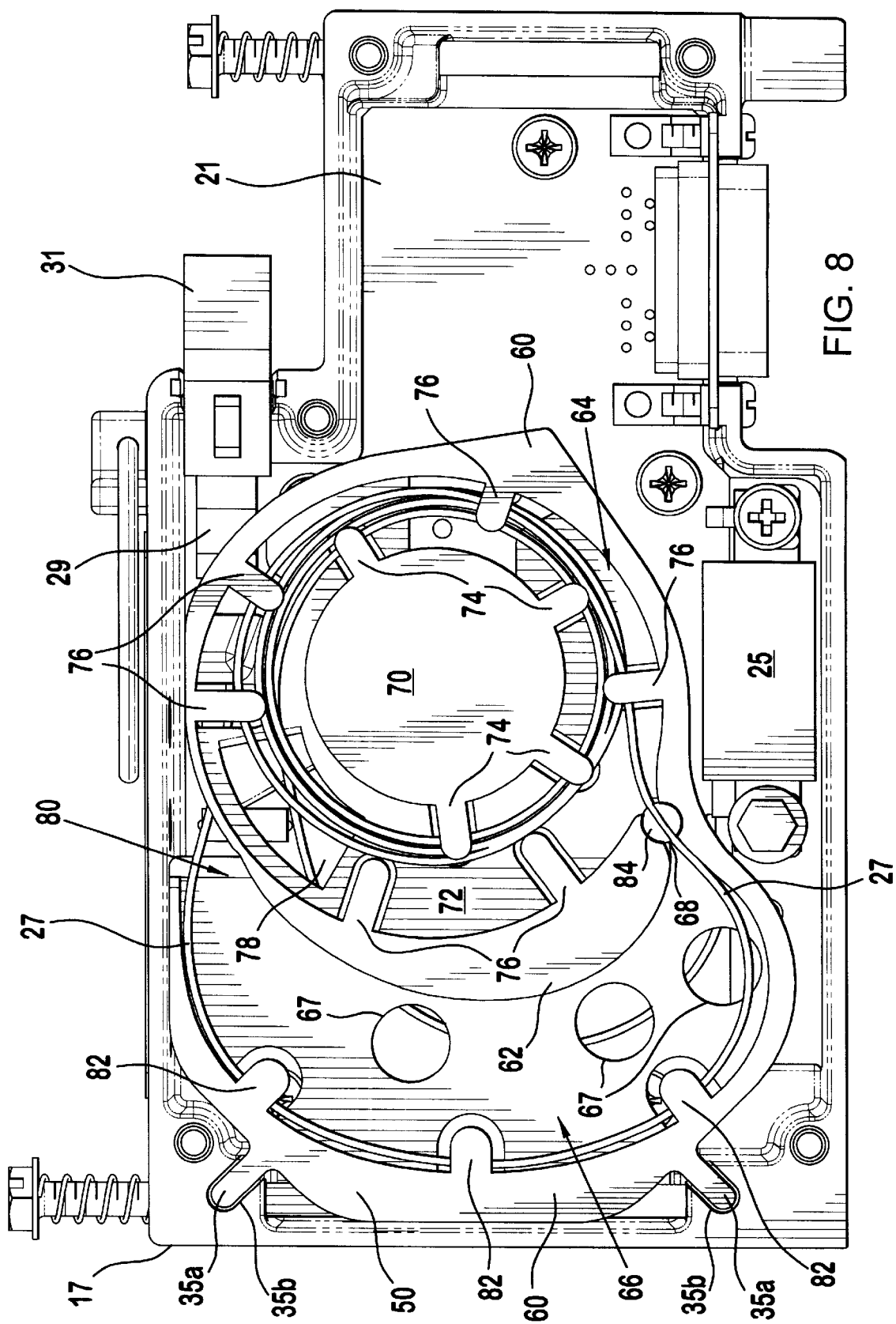
FIG. 8 is a top plan view of an enclosure with the cover removed and the coiling tray of FIG. 3 positioned therein.

Having described the components of the preferred coiling tray 50, its use in conjunction with an enclosure 15 will be described with reference to FIGS. 7 and 8.

The coiling tray 50 is positioned in the enclosure 15. A pair of outwardly projecting tabs 35a, with an angular displacement relative to each other, engage slots 35b cast into the housing frame 17 to locate and position the coiling tray 50. Upon exiting the transmitter or receiver module 25, the fiber 27 and connector 29 pass around the guide walls 56a and 56b and through the ramped aperture 78 into chamber 64. The cable 27 is passed around the guide walls 56a and 56b such that it is visible through sighting windows 67 selectively located in the platform 50 of chamber 66. The fiber 27 is loosely wound around mandrel 70. The remaining fiber 27 is routed from chamber 64 through passage 68 into chamber 66. The connector end of the cable 27a exits through the outlet 80 and is connected to the adapter 31 which is positionable in the enclosure slot 39.

A retainer 84 is positioned about and frictionally engages the fiber optic cable 27. The retainer 84 is secured in the passage 68 between the two chambers 64 and 66. The retainer 84 is preferably a rubber ferrule with a passage therethrough or an adhesive or potting compound. Other materials and configurations may also be utilized. The retainer 84 protects the fiber optic cable 27 to prevent pinching or crimping. Additionally, since the retainer 84 frictionally engages the cable 27, it prevents the portion of cable 27 in chamber 64 from passing into chamber 66. As such, the amount of cable 27 passing through chamber 66 and terminating in the connector 29 can be fixed at a desired length. The length is preferably selected such that it permits sufficient withdrawal of the connector 29/adapter 31 assembly, but is limited to fit within the arcuate path defined by the peripheral wall 62 about chamber 66.

While the present invention has described in terms of the preferred embodiment, other variations which are within the scope of the invention as outlined in the claims below will be apparent to those skilled in the art. Additionally, while the present invention has been described in use with a connector enclosure, it may be used with various fiber optic systems and assemblies.

What is claimed is:

1. A fiber optic cable tray comprising:
   a platform defined by a geometrically configured edge;
   a peripheral wall extending from the platform along a portion of the edge;
   an internal wall extending from the platform between the peripheral wall to define first and second chambers and a passage therebetween;
   a retainer positionable in the passage and adapted to receive and arrestingly engage a fiber optic cable, having a minimum bend radius, extending from the first chamber to the second chamber such that the portion of cable passing through the second chamber has a fixed length.

2. The tray of claim 1 wherein the internal wall has a first surface and the internal wall first surface and a first portion of the peripheral wall define the first chamber.

3. The tray of claim 2 wherein the internal wall first surface and the peripheral wall first portion have arcuate shapes such that the first chamber has a substantially circular configuration.

4. The tray of claim 3 wherein a mandrel extends from the platform within the first chamber.

5. The tray of claim 4 wherein the mandrel has a substantially circular shape such that a substantially circular cable storage area is defined between the mandrel and the internal wall first surface and the peripheral wall first portion.

6. The tray of claim 5 wherein the mandrel has a radius equal to or greater than the cable minimum bend radius.

7. The tray of claim 1 wherein the second chamber is defined by a second surface of the internal wall and a second portion of the peripheral wall.

8. The tray of claim 7 wherein the internal wall second surface has an arcuate shape with a minimum radius thereof being equal to or greater than the cable minimum bend radius.

9. The tray of claim 1 wherein the second chamber includes an outlet and a portion of the platform slopes from the passage to the outlet.

10. The tray of claim 1 wherein the retainer is a rubber ferrule having an aperture therethrough.

11. The tray of claim 1 wherein the retainer is formed from potting compound positioned about the cable.

12. The tray of claim 1 wherein the platform is supported by at least one dependature depending therefrom and an includes an inlet into the first chamber defined by an opening having a ramp depending therefrom.

13. An optical communication component comprising:

a housing frame for housing an optical processing module and associated optical connector;

said optical processing module mounted within said housing frame and said optical connector detachably mounted within a selectively configured opening of said housing frame;

a fiber optic cable, having a minimum bend radius, coupling the module and the optical connector and routed through a coiling tray positioned within the housing frame, the coiling tray comprising:

a platform defined by a geometrically configured edge;

a peripheral wall extending from the platform along a portion of the edge;

an internal wall extending from the platform between the peripheral wall to define first and second chambers and a passage therebetween, the cable passing from the first chamber, through the passage, to a portion of the cable that passes through the second chamber and terminates at the optical connector; and a retainer positionable in the passage and adapted to receive and arrestingly engage the fiber optic cable as it passes from the first chamber to the second chamber, such that, the portion of the cable passing through the second chamber and terminating at the optical connector has a fixed length whereby the connector may be detached from said housing frame and withdrawn a predetermined distance limited by the fixed length of cable.

14. The tray of claim 13 wherein the second chamber includes an outlet and a portion of the peripheral wall extends between the passage and the outlet and has a length of X.

15. The tray of claim 14 wherein the outlet is spaced from the selectively configured opening of said housing frame by a distance of Y and the connector has a given length such that the fixed length of cable plus the given length of the connector is equal to or less than X plus Y.

* * * * *

UNITED STATES PATENT AND TRADEMARK OFFICE
CERTIFICATE OF CORRECTION

PATENT NO. : 6,249,634 B1　　　　　　　　　　　　　　　　　　　　　　　Page 1 of 1
DATED     : June 19, 2001
INVENTOR(S) : Tenney et al.

It is certified that error appears in the above-identified patent and that said Letters Patent is hereby corrected as shown below:

<u>Column 5,</u>
Line 6, delete "an".

Signed and Sealed this

Twenty-sixth Day of February, 2002

Attest:

Attesting Officer

JAMES E. ROGAN
*Director of the United States Patent and Trademark Office*